United States Patent

Mormile et al.

[11] Patent Number: 5,578,675
[45] Date of Patent: Nov. 26, 1996

[54] NON-ISOCYANATE BASECOAT/CLEARCOAT COATING COMPOSITIONS WHICH MAY BE AMBIENT CURED

[75] Inventors: Patrick J. Mormile, Bowling Green; Rajnikant P. Shah, Holland; Anthony J. Tye, Toledo, all of Ohio

[73] Assignee: BASF Corporation, Mount Olive, N.J.

[21] Appl. No.: 331,313

[22] Filed: Dec. 27, 1994

Related U.S. Application Data

[63] Continuation of Ser. No. 95,080, Jul. 21, 1993, abandoned.
[51] Int. Cl.⁶ .............................. C08G 18/00; C08L 75/00
[52] U.S. Cl. ......................... 524/589; 524/590; 524/871; 528/44
[58] Field of Search ...................................... 525/207, 267, 525/327.6, 329.9, 376; 524/590, 773, 874; 528/44

[56] References Cited

U.S. PATENT DOCUMENTS

| | | | |
|---|---|---|---|
| 4,452,948 | 6/1984 | Marrion et al. | 525/207 |
| 4,565,843 | 1/1986 | Dünwald | 525/540 |
| 4,826,921 | 5/1989 | Andrews et al. | 525/207 |
| 5,006,413 | 4/1991 | Den Hartog et al. | 524/507 |
| 5,218,055 | 6/1993 | Marrion et al. | 525/327.6 |

*Primary Examiner*—Tae Yoon
*Attorney, Agent, or Firm*—Michael R. Chipaloski

[57] ABSTRACT

Improved basecoat—clearcoat paint coating compositions which may be ambient cured are disclosed. The coating compositions comprise:

1) a hydroxyl functional coreactant,
2) at least one anhydride functional coreactant and,
3) a carbodiimide compound.

The improved compositions cure at a rate especially useful as refinish paint compositions.

7 Claims, No Drawings

NON-ISOCYANATE BASECOAT/CLEARCOAT COATING COMPOSITIONS WHICH MAY BE AMBIENT CURED

This is a continuation of application Ser. No. 08/095,080 filed on Jul. 21, 1993 abandoned.

BACKGROUND OF THE INVENTION

The current invention relates to a composition and method of forming a basecoat/clearcoat coating that does not utilize Isocyanate functional crosslinking agents. Currently, in the automotive refinish as well as general coatings marketplace, Isocyanate functional crosslinking agents are used in many applications where extreme durability is required. The toughness and chemical resistance of coatings that have been crosslinked by the Isocyanate/Hydroxyl reaction to form Urethane bonds are considered the industry standard for highly durable coatings applications.

In the current environment of regulations intended to reduce the amount of volatile organic compounds (or VOC) that are released into the atmosphere on application of coatings, it is very difficult to formulate coatings compositions that meet the regulatory limits without some kind of crosslinking mechanism that takes place after application. In order to achieve a suitable spray application viscosity (20–30 seconds #4 Ford cup @20° C.) as VOC regulations have mandated higher application non-volatiles, it has been necessary to use resins with lower molecular weights and generally lower Tg. Both of these changes generally have the effect of lengthening the dry time of the applied coating since the number of crosslink reactions required to achieve a "dry to handle" condition increases significantly. Due to the need to increase the number of crosslinking reactions to achieve the "dry to handle" condition, faster reaction rate crosslinking reactions are desirable. One reaction well known to the art is that of carboxylic acid functionality and carbodiimide functionality. The problem with the carboxylic acid/carbodiimide chemistry is the reaction rate is extremely fast. There is very little time available after these materials are mixed in which the coatings may be applied to the intended substrate. Also, the cost of development and color matching of automotive refinish coatings systems that employ acid functional backbone resins would be very high. The present invention relates a chemistry and method for converting a product line, based on active hydrogen functionality, which was originally intended to be crosslinked with Isocyanate functional crosslinking agents, in situ, to carboxylic acid functionality. This carboxylic acid functionality will then readily react with carbodiimide functionality. While the carboxylic acid/carbodiimide reaction is very rapid, the "relay reaction" rate of active hydrogen to carboxylic acid by the ring opening of the anhydride by the active hydrogen group may be controlled by the choice of anhydride and, optionally, the use of catalyst. Also, carbodiimide functional materials may be designed specifically to provide desired final properties. Processes for the preparation of useful polycarbodiimides are described in application Ser. No. 95,076 filed Jul. 21, 1993, now U.S. Pat. No. 5,357,021.

SUMMARY OF THE INVENTION

The present invention relates to novel coating compositions which can be cured at ambient conditions or which may be baked. The coatings are especially useful as automotive refinish paint compositions. Compositions of the current invention comprise a basecoat which is overcoated with a clearcoat. The basecoat of the current invention typically contains at least one pigment and other well known paint additives such as fillers, rheology control agents, dispersing agents, etc.

The basecoat coating composition typically comprises:

a) a coreactant having an active hydrogen functionality, b) at least one anhydride functional coreactant, and c) a carbodiimide compound having the structure:

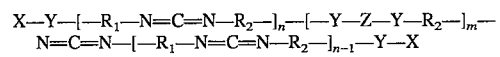

Wherein:

m is from 0 to 1 n is from 1 to 10

$R_1$=A divalent hydrocarbon residue from a diisocyanate having a tertiary hydrocarbon such as:

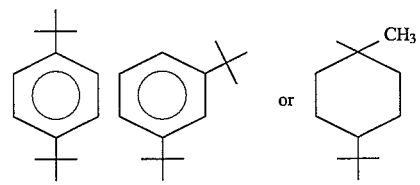

$R_2$=A divalent hydrocarbon residue from a diisocyanate selected from:

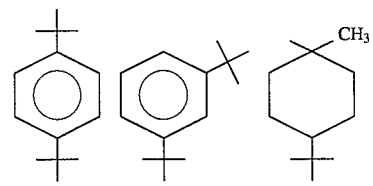

or residues from aliphatic, branched aliphatic or cycloaliphatic diisocyanates, including biurets, allophonates, isocyanurates or uretdiones thereof.

X=Any radical with substituents that are unreactive towards a carbodiimide. For example: Aliphatic, branched aliphatic, cycloaliphatic or aromatic hydrocarbon, organosilane or salted sulfonic acid radicals.

Or:

A polymeric radical, for example, a polyether polyester, polyurethane, acrylic resin, polycarbonates and mixtures thereof.

Y=

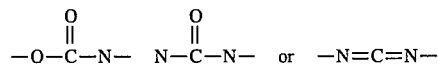

Z=A polyvalent radical with substituents that are unreactive towards a carbodiimide to function as an extending or branching site.

For example:

Aliphatic, branched aliphatic, cycloaliphatic or aromatic hydrocarbon, organosilane or salted sulfonic acid radicals.

Or:

A polymeric radical, for example, a polyether, polyester, polyurethane, acrylic resin, polycarbonates and mixtures thereof.

d) at least one pigment, e) additives known to the art, f) and, optionally, one or more catalysts.

Alternatively, carbodiimide compounds having the structure:

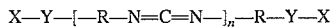

have shown utility in the current invention.

Wherein:

n is from 2–20, preferably 2 to 8

R=A divalent hydrocarbon radical having the following structure.

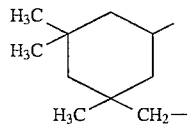

X=A n-butyl radical.

Y=—N=C=N—

Material having this structure is available from Union Carbide as Ucarlnk XL20E.

Alternatively, carbodiimide compounds having the structure:

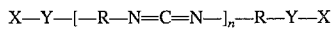

have shown utility in the current invention.

Wherein:

n is from 2–20, preferably 4 to 8

R=A divalent hydrocarbon radical having the following structure.

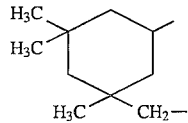

X=A methoxy terminated polyethylene oxide radical having the following structure:

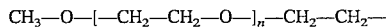

Where: n=6–112

Y=

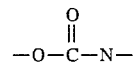

Material having this structure is available from Union Carbide as Ucarlnk XL29SE.

The clearcoat coating composition typically comprises:

a) a coreactant having an active hydrogen functionality, b) at least one anhydride functional coreactant, and c) a carbodiimide compound having the structure:

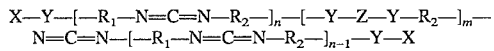

Wherein:

m is from 0 to 1 n is from 1 to 10

$R_1$=A divalent hydrocarbon residue from a diisocyanate having a tertiary hydrocarbon such as:

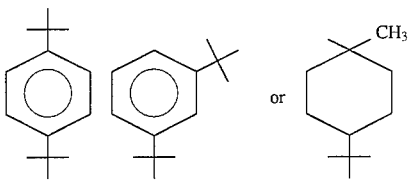

$R_2$=A divalent hydrocarbon residue from a diisocyanate selected from:

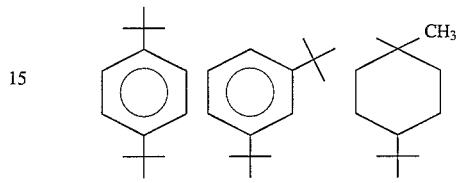

or residues from aliphatic, branched aliphatic or cycloaliphatic diisocyanates, including biurets, allophonates, isocyanurates or uretdiones thereof.

X=Any radical with substituents that are unreactive towards a carbodiimide. For example: Aliphatic, branched aliphatic, cycloaliphatic or aromatic hydrocarbon, organosilane or salted sulfonic acid radicals.

Or:

A polymeric radical, for example, a polyether polyester, polyurethane, acrylic resin, polycarbonates and mixtures thereof.

Y=

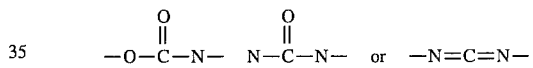

Z=A polyvalent radical with substituents that are unreactive towards a carbodiimide to function as an extending or branching site.

For example:

Aliphatic, branched aliphatic, cycloaliphatic or aromatic hydrocarbon, organosilane or salted sulfonic acid radicals.

Or:

A polymeric radical, for example, a polyether, polyester, polyurethane, acrylic resin, polycarbonates and mixtures thereof.

d) additives known to the art, e) and, optionally, one or more catalysts.

Alternatively, carbodiimide compounds having the structure:

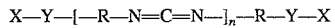

have shown utility in the current invention.

Wherein:

n is from 2–20, preferably 2 to 8

R=A divalent hydrocarbon radical having the following structure.

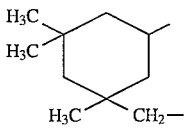

X=A n-butyl radical.
Y=—N=C=N—

Material having this structure is available from Union Carbide as Ucarlnk XL20E.

Alternatively, carbodiimide compounds having the structure:

$$X-Y-[-R-N=C=N-]_n-R-Y-X$$

have shown utility in the current invention.
Wherein:
n is from 2–20, preferably 4 to 8
R=A divalent hydrocarbon radical having the following structure.

$$\text{(3,5,5-trimethylcyclohexylmethyl divalent radical structure)}$$

X=A methoxy terminated polyethylene oxide radical having the following structure:

$$CH_3-O-[-CH_2-CH_2-O-]_n-CH_2-CH_2-$$

Where: n=6–112
Y=

$$-O-\overset{O}{\underset{\|}{C}}-N-$$

Material having this structure is available from Union Carbide as Ucarlnk XL29SE.

DETAILED DESCRIPTION OF THE INVENTION

The basecoat/clearcoat coating compositions of the current invention are especially useful as an alternative to isocyanate crosslinked coating compositions. Such compositions may be expected to exhibit enhanced film integrity due to the intracoat and intercoat crosslinking of the basecoat. Such coatings may also be expected to exhibit greater repairability and exterior durability again due to the crosslinking of the basecoat and grafting to the clearcoat. Coatings of the current invention can be cured at ambient temperature, the coatings may also be baked to cure.

This invention also describes a method to reduce the volatile organic content (VOC) of a basecoat/clearcoat coating composition by increasing the solids of the paint composition without adversely affecting the sprayable viscosity of the paint and also without significantly decreasing the durability or performance of the final paint film so produced. This invention also relates to a method of converting an already existing, commercial, isocyanate crosslinked product line to a non-isocyanate crosslinked product line.

The basecoat coating composition typically comprises:
a) a coreactant having an active hydrogen functionality,
b) at least one anhydride functional coreactant, and
c) a carbodiimide compound having the structure:

$$X-Y-[-R_1-N=C=N-R_2-]_n-[-Y-Z-Y-R_2-]_m-N=C=N-[-R_1-N=C=N-R_2-]_{n-1}-Y-X$$

Wherein:

m is from 0 to 1
n is from 1 to 10
$R_1$=A divalent hydrocarbon residue from a diisocyanate having a tertiary hydrocarbon such as:

$$\text{(aromatic and cycloaliphatic structures with CH}_3\text{ groups)}$$

$R_2$=A divalent hydrocarbon residue from a diisocyanate selected from:

$$\text{(aromatic and cycloaliphatic structures with CH}_3\text{ groups)}$$

or residues from aliphatic, branched aliphatic or cycloaliphatic diisocyanates, including biurets, allophonates, isocyanurates or uretdiones thereof.

X=Any radical with substituents that are unreactive towards a carbodiimide. For example:
Aliphatic, branched aliphatic, cycloaliphatic or aromatic hydrocarbon, organosilane or salted sulfonic acid radicals.
Or:
A polymeric radical, for example, a polyether polyester, polyurethane, acrylic resin, polycarbonates and mixtures thereof.
Y=

$$-O-\overset{O}{\underset{\|}{C}}-N- \quad N-\overset{O}{\underset{\|}{C}}-N- \quad \text{or} \quad -N=C=N-$$

Z=A polyvalent radical with substituents that are unreactive towards a carbodiimide to function as an extending or branching site.
For example:
Aliphatic, branched aliphatic, cycloaliphatic or aromatic hydrocarbon, organosilane or salted sulfonic acid radicals.
Or:
A polymeric radical, for example, a polyether, polyester, polyurethane, acrylic resin, polycarbonates and mixtures thereof.
d) at least one pigment,
e) additives known to the art,
f) and, optionally, one or more catalysts.

Alternatively, carbodiimide compounds having the structure:

$$X-Y-[-R-N=C=N-]_n-R-Y-X$$

have shown utility in the current invention.
Wherein:
n is from 2–20, preferably 2 to 8
R=A divalent hydrocarbon radical having the following structure.

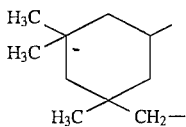

X=A n-butyl radical.
Y=—N=C=N—
Material having this structure is available from Union Carbide as Ucarlnk XL20E.
Alternatively, carbodiimide compounds having the structure:

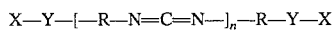

have shown utility in the current invention.
Wherein:
n is from 2–20, preferably 4 to 8
R=A divalent hydrocarbon radical having the following structure.

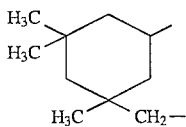

X=A methoxy terminated polyethylene oxide radical having the following structure:

$$CH_3-O-[-CH_2-CH_2-O-]_n-CH_2-CH_2-$$

Where: n=6–112
Y=

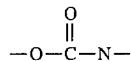

Material having this structure is available from Union Carbide as Ucarlnk XL29SE.
The clearcoat coating composition typically comprises:
a) a coreactant having an active hydrogen functionality,
b) at least one anhydride functional coreactant, and
c) a carbodiimide compound having the structure:

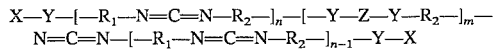

Wherein:
m is from 0 to 1
n is from 1 to 10
R$_1$=A divalent hydrocarbon residue from a diisocyanate having a tertiary hydrocarbon such as:

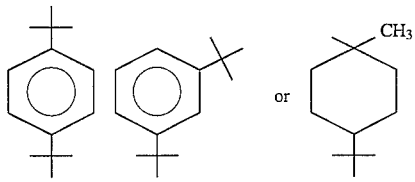

R$_2$=A divalent hydrocarbon residue from a diisocyanate selected from:

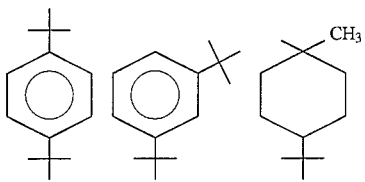

or residues from aliphatic, branched aliphatic or cycloaliphatic diisocyanates, including biurets, allophonates, isocyanurates or uretdiones thereof.
X=Any radical with substituents that are unreactive towards a carbodiimide. For example: Aliphatic, branched aliphatic, cycloaliphatic or aromatic hydrocarbon, organosilane or salted sulfonic acid radicals.
Or:
A polymeric radical, for example, a polyether polyester, polyurethane, acrylic resin, polycarbonates and mixtures thereof.
Y=

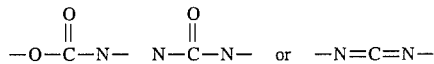

Z=A polyvalent radical with substituents that are unreactive towards a carbodiimide to function as an extending or branching site.
For example:
Aliphatic, branched aliphatic, cycloaliphatic or aromatic hydrocarbon, organosilane or salted sulfonic acid radicals.
Or:
A polymeric radical, for example, a polyether, polyester, polyurethane, acrylic resin, polycarbonates and mixtures thereof.
d) additives known to the art,
e) and, optionally, one or more catalysts.
Alternatively, carbodiimide compounds having the structure:

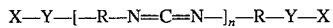

have shown utility in the current invention.
Wherein:
n is from 2–20, preferably 2 to 8
R=A divalent hydrocarbon radical having the following structure.

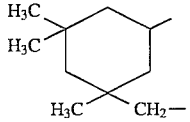

X=A n-butyl radical.
Y=—N=C=N—
Material having this structure is available from Union Carbide as Ucarlnk XL20E.
Alternatively, carbodiimide compounds having the structure:

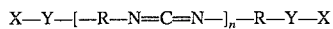

have shown utility in the current invention.
Wherein:
n is from 2–20, preferably 4 to 8

R=A divalent hydrocarbon radical having the following structure.

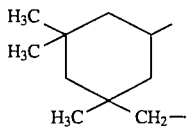

X=A methoxy terminated polyethylene oxide radical having the following structure:

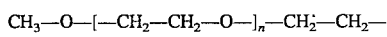

Where: n+6–112
Y=

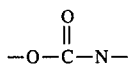

Material having this structure is available from Union Carbide as Ucarlnk XL29SE.

When a non-crosslinked basecoat is overcoated with a clearcoat, the clearcoat will release solvent into the atmosphere and into the basecoat. Since the solubility of the uncrosslinked basecoat in the solvents of the clearcoat is undiminished by crosslinking, the basecoat can absorb large amounts of solvent from the clearcoat. When the clearcoat is crosslinked, solvent so absorbed can become entrapped in the basecoat film by the crosslinking of the clearcoat. Such entrapped solvent is commonly the source for basecoat/ clearcoat intercoat adhesion loss. The basecoat compositions of the current invention have an improvement over non crosslinked basecoats in that the crosslinking of the current invention renders the basecoat less soluble in the solvents of the clearcoat and lessens the solvent absorption from the clearcoat.

According to the current invention, any basecoat composition having a hydroxyl functional resin may be crosslinked by the constituents of the current invention. These constituents are typically added to the basecoat immediately before application of the basecoat. The stoichiometry of utility is available elsewhere in this document. The basecoat is then applied to the intended substrate. During the normal drying time, or flash off, of the non-isocyanate crosslinked basecoat composition, the resins of the basecoat undergo chain extension thus lessening the basecoat resin solubility in solvents common to automotive refinish basecoat/clearcoat coating compositions. This flash off time may be as little as 30 minutes or as long as 24 hours. Non-Isocyanate crosslinked clearcoat compositions of the current invention are then applied to the basecoat. These clearcoats are less able to release solvent into the basecoat because of the crosslinking of the basecoat resins. The clearcoat compositions of the current invention are able to graft onto the basecoat due to the presence of the appropriate functionality in the basecoat. Likewise, the basecoat is able to graft onto the clearcoat due to the presence of the appropriate functionality in the clearcoat composition.

Another advantage of the current invention occurs during recoat/repair operations. If the need arises for a repair operation on a basecoat/clearcoat application, the coating defect is typically sanded away. This process typically exposes the undercoat and leaves a feather edge of basecoat exposed. Basecoat and Clearcoat are then reapplied. Since non-crosslinked basecoat is capable of and, in fact, has no mechanism to resist the absorption of solvent from the new coatings application, swelling, lifting, or wrinkling of non- crosslinked basecoat at the feather edge is a common problem encountered in repair operations. The crosslinked basecoat compositions of the current invention provide the increase in molecular weight that lessens the solubility of the basecoat in the solvents of the repair coatings.

Compositions of the current invention may be expected to exhibit enhanced film integrity due to the intracoat and intercoat crosslinking of the basecoat. Such coatings may also be expected to exhibit greater repairability and exterior durability again due to the crosslinking of the basecoat and grafting to the clearcoat.

Useful stoichiometric ratios of coreactants for the coating systems can range from a 1/0.1/0.1 molar ratio of the active hydrogen functionality of the active hydrogen functional coreactant to the anhydride functionality of the anhydride functional coreactant to the carbodiimide functionality of the carbodiimide functional coreactant to a 1/3/3 molar ratio of the active hydrogen functionality of the active hydrogen functional coreactant to the anhydride functionality of the anhydride functional coreactant to the carbodiimide functionality of the carbodiimide functional coreactant. However, preferred stoichiometric ratios range from a 1/0.25/ 0.25 molar ratio of the active hydrogen functionality of the active hydrogen functional coreactant to the anhydride functionality of the anhydride functional coreactant to the carbodiimide functionality of the carbodiimide functional coreactant to a 1/1.25/1.25 molar ratio of the active hydrogen functionality of the active hydrogen functional coreactant to the anhydride functionality of the anhydride functional coreactant to the carbodiimide functionality of the carbodiimide functional coreactant. It has also been noted that while the molar ratio of the functionality of the anhydride and carbodiimide coreactants are preferably held at equivalence, the molar ratio of the active hydrogen functionality and anhydride functionality can vary from equivalence to as much as a fifty percent deficit in anhydride functionality without significant reduction in final system properties.

This invention also describes a relay reaction process and coating composition wherein a relay reactant is used to convert a coreactant with active hydrogen functionality (in this example, hydroxyl functionality) in-situ, to carboxyl functionality. The cure reaction that takes place after this relay reaction process is that of carboxyl functionality with carbodiimide functionality (See Reaction Scheme #1). The relay reactant component, monofunctional anhydride (1), of the coating composition transforms the initial hydroxyl functional coreactant (2), which is virtually unreactive toward carbodiimide, into a carboxyl functional coreactant (3) (See Scheme #1 reaction A).This carboxyl functional coreactant (3) reacts very rapidly with carbodiimide (4) to form an N-acyl urea (#5) (See Scheme #1 reaction B). The choice of relay reactant provides a critical rate determining step. The reaction of carboxyl and carbodiimide functionality is extremely rapid but the choice of relay reactant can provide different relay reaction rates as well as impart different final film properties according to the nature of the relay reactant. Anhydrides function as the preferred relay reactant according to the instant invention.

Reaction Scheme #1

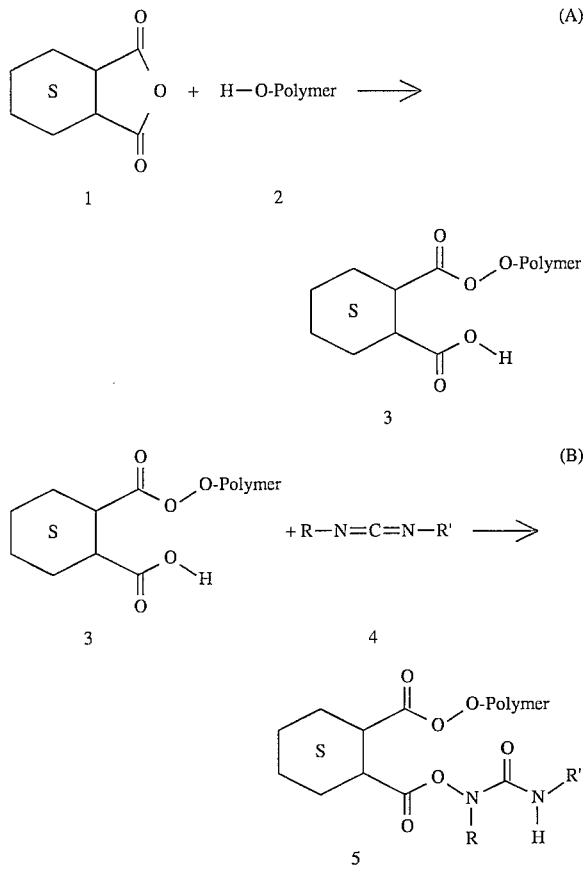

The active hydrogen functional component for a composition of the invention typically comprises a film-forming polymer. However, an active hydrogen component which is not polymeric may be utilized. However, it is necessary that at least the combination of the anhydride component with the active hydrogen component result in an acid functional moiety. Examples of active hydrogen functional components for a composition of the invention include but are not limited to: (a) simple mono functional alcohols, simple diols, triols and higher hydric alcohols also including those having additional functional groups such as the various aminoalcohols; (b) acrylic polyols; (c) polyester polyols; (d) polyether polyols; (e) amide-containing polyols; (f) epoxy polyols; (g) polyhydric polyvinyl alcohols; (h) cellulose and derivatives thereof (i) urethane polyols; (j) primary or secondary amines; (k) mercaptans and mixtures thereof.

The simple monofunctional alcohols, simple diols, triols and higher hydric alcohols (a) are generally known, examples of which include but are not limited to: ethyl hexanol; n-butanol; ethylene glycol; propylene glycol; 1,2-butanediol; 1,4- butanediol; 1,3-butanediol; 2,2,4-trimethyl-1,3-pentanediol; 1,5-pentanediol; 2,4-pentanediol; 1,6-hexanediol; 2,5-hexanediol; 2-methyl-1,3-pentanediol; 2-methyl-2,4-pentanediol; 2,4-heptanediol; 2-ethyl-1,3hexanediol; 2,2-dimethyl-1,3-propanediol; 1,4-cyclohexanediol; 1,4-cyclohexane-dimethanol; 1,2-bis-(hydroxymethyl)cyclohexane; 1,2-bis(hydroxyethyl)cyclohexane; 2,2-dimethyl-3-hydroxypropyl-2,2-dimethyl-3-hydroxypropionate; diethylene glycol; dipropylene glycol; bis hydroxypropyl hydantoins; tris hydroxyethyl isocyanurate; the alkoxylation product of 1 mole of 2,2-bis(4-hydroxyphenyl)propane (i.e., bisphenol-A) and 2 moles of propylene oxide available as DOW-365 from DOW Chemical Company; monoethanolamine; diethanolamine; triethanolamine; N-methyl-monoethanolamine; 2-hydroxymethyl-2-dimelates onto unsaturated polyesters and copolymers of allyl alcohol, for example styrene/allyl alcohol copolymers optionally containing allyl ester units.

The molecular weight of suitable monofunctional alcohols, diols, or higher hydric alcohols useful for preparation of compositions of the invention can vary within wide limits depending on the nature of, and the specific class of alcohol selected. The hydroxyl equivalent weight of alcohols suitable for preparation of the compositions of the invention can likewise vary widely. However, typically the number average molecular weight of suitable alcohols can range from 32 to 50,000, preferably from 1,000 to 20,000; and the hydroxyl equivalent weight can range from 32 to 25,000, preferably from 100 to 2,000.

Acrylic polyols (b) include but are not limited to the known hydroxyl-functional addition polymers and co-polymers of acrylic and methacrylic acids and their ester derivatives including but not limited to their hydroxyl-functional ester derivatives (e.g. the hydroxyalkyl acrylates and methacrylates), acrylamide and methacrylamide, and unsaturated nitriles such as acrylonitrile and methacrylonitrile. Additional examples of acrylic monomers which can be addition polymerized to form acrylic polyols include hydroxyethyl (meth)acrylate hydroxypropyl (meth)acrylate, methyl (meth)acrylate, ethyl (meth)acrylate, propyl, (meth)acrylate, isopropyl (meth)acrylate, butyl (meth)acrylate, t-butyl (meth)-acrylate, 2-ethylhexyl (meth)acrylate, n-hexyl-(meth)acrylate, cyclohexyl (meth)acrylate, 3,3,5-trimethylcyclohexyl (meth)-acrylate, decyl (meth)acrylate, isodecyl (meth)acrylate, lauryl (meth)acrylate, stearyl (meth)acrylate, phenyl (meth)acrylate, and isobornyl (meth)acrylate.

The molecular weight of suitable acrylic polyols for preparation of compositions of the invention can vary within wide limits depending on the nature of the specific class of acrylic polyol selected. The hydroxyl equivalent weight of acrylic polyols suitable for preparation of the compositions of the invention can likewise vary widely. However, typically, the number average molecular weight of suitable acrylic polyols can range from 62 to 50,000, preferably from 1,000 to 20,000; and the hydroxyl equivalent weight can range from 31 to 25,000, preferably from 100 to 2,000. When an acrylic polyol is utilized, which is preferred, its peak molecular weight as determined by gel permeation chromatography utilizing a polystyrene standard is generally in the range of from about 1,000 to about 50,000.

Polyester polyols (c) are generally known and typically are prepared by conventional techniques utilizing simple diols, triols and higher hydric alcohols known in the art including but not limited to the previously described simple diols, triols, and higher hydric alcohols (optionally in combination with monohydric alcohols) with polycarboxylic acids. Examples of suitable poly-carboxylic acids include: phthalic acid; isophthalic acid; tere-phthalic acid; trimellitic acid; tetrahydrophthalic acid, hexahydrophthalic acid; tetrachlorophthalic acid; adipic acid, azelaic acid, sebacic acid; succinic acid; malic acid; glutaric acid; malonic acid; pimelic acid; suberic acid; 2,2-dimethylsuccinic acid; 3,3-dimethylglutaric acid; 2,2-dimethylglutaric acid; maleic acid; fumeric acid, itaconic acid; and the like. Anhydrides of the above acids, where they exist, can also be employed and are encompassed by the term "polycarboxylic acid". In addition, certain materials which react in a manner similar to acids to form polyester polyols are also useful. Such materials include lactones such as caprolactone, propyllactone and methyl caprolactone and hydroxy acids such as hydroxycaproic acid and dimethylolpropionic acid. If a triol or higher hydric alcohol is used, a monocarboxylic acid, such as acetic acid and benzoic acid, may be used in the preparation of the polyester polyol and for some purposes, such a polyester polyol may be desirable. Moreover, polyester polyols are understood herein to include polyester polyols modified with fatty acids or glyceride oils of fatty acids (i.e., conventional alkyd polyols containing such modification). Another suitable polyester polyol is one prepared by reacting an alkylene oxide such as ethylene oxide, propylene oxide, butylglycedyl ester, and the glycidyl esters of organic acids such as CARDURA-E with the carboxylic acid to form the corresponding ester.

The molecular weight of suitable polyester polyols for preparation of compositions of the invention can vary within wide limits depending on the nature of the specific class of polyester polyol selected. The hydroxyl equivalent weight of polyester polyols suitable for preparation of the compositions of the invention can likewise vary widely. However, typically, the number average molecular weight of suitable polyester polyols can range from 62 to 50,000, preferably from 1,000 to 20,000; and the hydroxyl equivalent weight can range from 31 to 25,000, preferably from 100 to 2,000.

Polyether polyols (d) are generally known. Examples of polyether polyols include but are not limited to the poly-(oxyethylene) glycols and poly-(oxypropylene) glycols prepared by the acid or base catalyzed addition of ethylene oxide or propylene oxide to initiators such as water, ethylene glycol, propylene glycol, diethylene glycol and dipropylene glycol and by the copolymerization of ethylene oxide and propylene oxide with initiator compounds such as trimethylolpropane, glycerol, penterythritol, sorbitol, sucrose and the like. Examples of polyether polyols also include the generally known poly-(oxy-tetramethylene) glycols prepared by the polymerization of tetra-hydrofuran in the presence of Lewis acid catalysts such as boron trifluoride, tin (IV) chloride, antimony pentachloride, antimony-trichloride, phorphorous pentafluoride and sulfonyl chloride. Other examples of polyether polyols include the generally known reaction products of 1,2-epoxide-containing compounds with polyols such as those included in the description of simple diols, triols and higher hydric alcohols above.

The molecular weight of suitable polyether polyols for preparation of compositions of the invention can vary within wide limits depending on the nature of the specific class of polyether polyol selected. The hydroxyl equivalent weight of polyether polyols suitable for preparation of the compositions of the invention can likewise vary widely. However, typically, the number average molecular weight of suitable polyether polyols can range from 62 to 50,000, preferably from 1,000 to 20,000; and the hydroxyl equivalent weight can range from 31 to 25,000, preferably from 100 to 2,000.

Amide-containing polyols (e) are generally known and typically are prepared from any of the above-described diacids or lactones and diols, triols and higher alcohols and diamines or aminoalcohols as illustrated, for example, by the reaction of neopentyl glycol, acipic acid and hexamethylenediamine. The amide-containing polyols also may be prepared through aminolysis by the reaction, for example, of carboxylates, carboxylic acids, or lactones with aminoalcohols. Examples of suitable diamines and aminoalcohols include hexamethylenediamine, ethylenediamine, phenylenediamines, toluenediamines, monoethanoamine, diethanolamine, N-methyl-monoethanolamine, isophorone diamine, 1,3-menthanediamine and the like.

The molecular weight of suitable amide containing polyols for preparation of compositions of the invention can vary within wide limits depending on the nature of the specific class of amide containing polyol selected. The hydroxyl equivalent weight of amide containing polyols suitable for preparation of the compositions of the invention can likewise vary widely. However, typically, the number average molecular weight of suitable amide containing polyols can range from 62 to 50,000, preferably from 1,000 to 20,000; and the hydroxyl equivalent weight can range from 31 to 25,000, preferably from 100 to 2,000.

Epoxy polyols (f) are generally known and can be prepared, for example, by the reaction of glycidyl ethers of polyphenols such as the diglycidyl ether of 2,2-bis(4-hydroxyphenyl)propane, with polyphenols such as 2,2-bis(4-hydroxyphenyl)propane. Epoxy polyols of varying molecular weights and average hydroxyl functionality can be prepared depending upon the ratio of starting materials used.

Polyhydric polyvinyl alcohols (g) are generally known and can be prepared, for example, by the addition polymerization of vinyl acetate in the presence of suitable initiators followed by hydrolysis of at least a portion of the acetate moieties. In the hydrolysis process hydroxyl groups are formed which are attached directly to the polymer backbone. In addition to homopolymers, copolymers of vinyl acetate and monomers such as vinyl chloride can be prepared and hydrolyzed in similar fashion to form polyhydric polyvinyl alcohol polyvinyl chloride copolymers.

The molecular weight of suitable polyhydric polyvinyl polyols for preparation of compositions of the invention can vary within wide limits depending on the nature of the specific class of polyhydric polyvinyl polyol selected. The hydroxyl equivalent weight of polyhydric polyvinyl polyols suitable for preparation of the compositions of the invention can likewise vary widely. However, typically, the number average molecular weight of suitable polyhydric polyvinyl polyols can range from 62 to 50,000, preferably from 1,000 to 20,000; and the hydroxyl equivalent weight can range from 31 to 25,000, preferably from 100 to 2,000.

Cellulose and derivatives thereof (h), which contain hydroxyl functionality, are generally known. Examples include: cellulose; cellulose acetate, cellulose propionate, cellulose butyrate, cellulose acetate butyrate, ethyl cellulose, hydroxyethyl cellulose, and mixtures thereof.

Urethane polyols (i) are generally known and can be prepared, for example, by reaction of an organic polyisocyanate with a polyol. The organic polyisocyanate may be aromatic, aliphatic, cycloaliphatic, or heterocyclic and may be unsubstituted or substituted with groups such as halogen, etc. Suitable polyisocyanates may be biurets, isocyanurates, uretdiones, or allophonates. Urethane polyols of varying molecular weights and average hydroxyl functionality can be prepared depending upon the ratio of starting materials used.

Additional examples of the hydroxy component can be found in U.S. Pat. No. 4,452,943 which is hereby incorporated by reference.

Other coreactants having an active hydrogen functionality that are useful according to the current invention include materials having primary or secondary amine functionality (j). These may be selected from the group that consists essentially of, diethylene triamine, triethylene tetramine, 1,6 hexamethylene diamine, the reaction product of three moles of 1,6 hexamethylene diamine and one mole of dimethyl maleate, triethyleneglycoldiamine, the reaction product of ethylene imine and an acid functional polymer, bis(4-amino cyclohexyl) methane, the reaction product of one mole of bis (4-amino cyclohexyl) methane and two moles of diethyl maleate, the reaction product of three moles of a dimer fatty acid and four moles of diethylene triamine. The molecular weight of suitable amine functional coreactants for preparation of compositions of the invention can vary within wide limits depending on the nature of the specific material and functionality selected. The amine equivalent weight of amine functional coreactants suitable for preparation of the resin compositions of the invention can vary widely. However, typically the number average molecular weight of suitable amine functional coreactants can range from 62 to 50,000, preferably from 1,000 to 20,000; and the amine equivalent weight can range from 31 to 25,000, preferably from 100 to 2,000.

Other coreactants having an active hydrogen functionality that are useful according to the current invention include materials having mercaptan functionality (k). These may be selected from the group that consists essentially of, trimethylol propane tris(3 mercapto propionate), pentaerythritol tetra(3 mercapto propionate), di-pentaerythritol tetra(3 mercapto propionate) The mercapto equivalent weight of mercaptan functional coreactants suitable for preparation of the resin compositions of the invention can vary widely. However, typically the number average molecular weight of suitable mercaptan functional coreactants can range from 62 to 50,000, preferably from 1,000 to 20,000; and the mercapto equivalent weight can range from 31 to 25,000, preferably from 100 to 2,000.

Useful according to this invention are mono anhydrides selected from the group consisting essentially of methyl hexahydrophthalic anhydride, hexahydrophthalic anhydride, dodecenyl succinic anhydride, hexadecenyl succinic anhydride, tetradecenyl succinic anhydride, octenyl succinic anhydride, octadecenyl succinic anhydride, methyl tetrahydrophthalic anhydride, tetrahydrophthalic anhydride, hexahydrophthalic anhydride, nadic methyl anhydride, maleic anhydride and mixtures thereof.

Also useful according to this invention are materials having multifunctional anhydride moieties selected from the group consisting essentially of maleic anhydride acrylic copolymers, anhydride polyurethane polymers, anhydride polyurethane oligomers, anhydride alkyds, anhydride polyesters, poly sebacic poly anhydride, poly azelaic poly anhydride, poly adipic poly anhydride and mixtures thereof.

Typically, a coating composition of the invention additionally comprises an effective amount of a catalytic agent for accelerating the relay reaction between the active hydrogen of the active hydrogen functional component (A) and anhydride groups of the anhydride component (B). Most often, the catalytic agent comprises an amino group, preferably a tertiary amino group. The amino group may be present in the molecule of component (A) or in a separate amine compound such as, for example, dimethyl cocoamine, triethylamine, triethanolamine and phenolic compounds containing at least two dialkyl-amino groups. In a preferred embodiment, the amino group is in a separate amine compound. Usually, the amino group-containing catalytic agent is incorporated in component (A) of a composition of the invention as a separate amine compound. However, one or more amino groups may be incorporated in a hydroxyl functional coreactant as pendant groups in a hydroxyl-containing copolymer, for example, an acrylic polyol prepared utilizing a dialkyl-amino-alkyl acrylate or methacrylate such as dimethylaminoethyl acrylate, diethylaminoethyl acrylate, dimethylaminoethyl methacrylate and diethlaminoethyl methacrylate, or a dialkyl-amino-alkyl-substituted amide such as dimethylaminopropyl methacrylamide. Although less preferred a secondary amine such as t-butylaminoethyl methacrylate may also be used. Alternatively, tertiary amine groups can be introduced into an acrylic polyol by copolymerizing glycidyl acrylate or methacrylate with other appropriate unsaturated comonomers and subsequently reacting the glycidyl groups with a secondary amine. Examples of useful catalysts would include, but are not limited to: mineral acids such as hydrochloric or sulfuric acid; alkali metal hydroxides such as sodium hydroxide; tin compounds such as stannous octoate or dibutyl tin oxide; aliphatic or aromatic amines such as triethyl amine, diethyl ethanol amine or dimethyl aniline; aromatic heterocyclic amines such as n-methyl imidazole; or cyclic amines such as triethylene diamine.

The components of a composition of the invention generally are incorporated in an organic solvent and/or diluent in which the materials employed are compatible and soluble to the desired extent. Organic solvents which may be utilized include, for example, alcohols, ketones, aromatic hydrocarbons, esters or mixtures thereof. Illustrative of organic solvents of the above type which may be employed are alcohols such as ethanol, propanol, isopropanol and butanol; ether alcohols such as ethylene glycol monoethyl ether, ethylene glycol monobutyl ether, propylene glycol monomethyl ether, and dipropylene glycol monoethyl ether, ketones such as methyl ethyl ketone, methyl n-butyl ketone, methyl n-amyl ketone, and methyl isobutyl ketone; esters such as n-butyl acetate, methoxy propyl acetate, and hexyl acetate; and aromatic hydrocarbons such as xylene, toluene, and naphtha.

Basecoat/clearcoat coating compositions typically contain additives well known to the art. Additives of utility in these coatings include silicones commonly used in the art. Mar and slip agents and defoamers which find utility include but are not limited to Byk 141, Byk 304, Byk 306, Byk 307, Byk 325, Byk 331, Byk 341, Dow Corning #7, Dow Corning #54, Dow Corning #200, General Electric SF-69, Troy Chemical Troysol S366, Troy Chemical Troysol AFL, Tego Glide 410, Miles OL44.

Also finding utility a reflow and rheology modifying agents which include but are not limited to synthetic amorphous hydrophobic silica such as Degussa Aerosil R972, synthetic amorphous hydrophilic silica Degussa Aerosil 200, organo clays, polyethylene wax dispersions, polypropylene wax dispersions, polyamid wax dispersions, ethylene vinyl acetate wax dispersions. Agents such as Byk Anti-terra 202, Byk Anti-terra 204, Byk Anti-terra V, Byk W-960, Byk R-405, Byk-P104, Byk P-104s; Troy Chemical Troythix Antisag 4, Troy Chemical Troythix Antisettle; Raybo Chemical Raybo 6, Raybo Chemical Raybo 94, and Tego Chemie ZFS 460.

Also finding utility are pigment wetting and dispersing aids which include but are not limited to ICI Solsperse hyperdispersants such as Solsperse 5000, Solsperse 12000, Solsperse 22000 and Solsperse 24000; Troy Chemical Troysol CD1, Troy Chemical Troysol CD2 and Troy Chemical Troysol 98C; Daniel Products DispersAyd 9100; Raybo Chemical Raybo 63; Byk Anti-terra U, Byk Anti terra 202, Byk W-960, Byk P-104 Disperbyk 160, Disperbyk 162, Disperbyk 163; Nuodex Nuosperse 657; Nuodex Nuosperse 700.

Also finding utility in these coatings are ultraviolet light absorbers and stabilizers which include but are not limited to Sandoz Chemicals Sanduvor 3206, Sanduvor VSU, Sanduvor 3050; Ciba Geigy Corp Tinuvin 123, Tinuvin 292, Tinuvin 328, Tinuvin 440, Tinuvin 900, Tinuvin 1130.

Also finding utility in these coatings are various types pigments common to the art which include but are not limited to titanium dioxide, graphite, carbon black, zinc oxide, cadmium sulfide, chromium oxide, zinc sulfide, zinc chromate, strontium chromate, barium chromate, lead chromate, lead cyanamide, lead silico chromate, chromium oxide, zinc sulfide, yellow nickel titanium, yellow chromium titanium, red iron oxide, aluminum flake, mica, coated aluminum flake, stainless steel flake, copper foil, and other special effect pigments known to the art, transparent red iron oxide, yellow iron oxides, transparent yellow oxide, black iron oxide, naphthol reds and browns, anthraquinones, dioxazine violet, isoindoline yellows, arylide yellow and oranges, ultramarine blue, phthalocyanine complexes, amaranth, quinacridones, halogenated thioindigo pigments, extender pigments such as magnesium silicate, aluminum silicate, calcium silicate, calcium carbonate, fumed silica, barium sulfate.

The coating composition can be applied using conventional spray equipment or high volume low pressure spray equipment resulting in a high quality finish. Other modes of application are roller coating, brushing, sprinkling, flow coating, dipping, electrostatic spraying, or electrophoresis. Exemplary metal substrates include such things as steel, aluminum, copper, zinc, magnesium and alloys thereof.

Exemplary non-metallic substrates include such things as the rigid and non-rigid plastics common to the art. The components of the compositions can be varied to suit the temperature tolerance of the substrate material.

Coating compositions described by the present invention find utility in applications of ambient or room temperature drying (e.g. less than 100° F.), force drying or low temperature baking (e.g.100° F.–180° F.), or high temperature baking (e.g. over 180° F.). The coating cure process for the present invention may also be accelerated by the utilization of radiant heating or Infra Red emitting devices known to the art.

The coatings may be formulated to meet the requirements of the equipment intended for use during application.

The pigments can be introduced by first forming a mill base with the active hydrogen functional resin utilized in the composition or with other compatible polymers by conventional techniques, such as sand-grinding, ball-milling, attritor grinding, two roll milling and the like, to disperse the pigments. The mill base is then blended with other film forming constituents as shown in the examples which follow:

The following examples are intended to illustrate the invention. All quantities are shown on a weight bases unless otherwise indicated.

ANHYDRIDES

Anhydride #1 is methyl hexahydrophthalic anhydride. (available from Huls Chemical)

Anhydride #2 is dodecenyl succinic anhydride. (available from Milliken Chemical)

Anhydride #3 is octenyl succinic anhydride. (available from Milliken Chemical)

Anhydride #4 is pure methyl tetrahydrophthalic anhydride. (available from Anhydrides and Chemicals)

Anhydride #5 is a eutectic blend of 60 weight percent methyl tetrahydrophthalic anhydride and 40 weight percent hexahydrophthalic anhydride. (available from Anhydrides and Chemicals)

Anhydride #6 is nadic methyl anhydride. (available from Ciba-Geigy)

CARBODIIMIDES

Carbodiimide #1 is Ucarlnk XL 29SE. (available from Union Carbide)

Carbodiimide #2 is Ucarlnk XL 20E. (available from Union Carbide)

Carbodiimide #3 is synthesized as follows.

A reaction vessel fitted with mechanical agitation, a reflux condenser, a thermocouple probe and a subsurface nitrogen inlet line was charged with 1549.6 gms.(6.34 moles) of meta-tetramethylxylene diisocyanate, 387.4 gms.(1.74 moles) of Isophorone diisocyanate and 19.4 gms.(0.10 moles) of 3-methyl-1-phenyl-2-phospholene-1-oxide. Under agitation and gentle nitrogen sparge, the mixture was heated to 145°–147° C. and maintained at that temperature for 30 hours. A sample was withdrawn and an Isocyanate value of 1.46 percent was determined per ASTM D2572-87. The reaction vessel was cooled to 60° C. and 968.5 gms. of methyl n-amyl ketone, 74.3 gms. of ethyl alcohol, and 0.8 gms. of dibutyltin dilaurate were then added to the vessel. The temperature was maintained at 60° C. Samples were withdrawn periodically. The Isocyanate value was determined as above until an Isocyanate value of zero was attained. The residual ethyl alcohol fraction was then removed via distillation under reduced pressure.

The resulting polycarbodiimide resin had a non-volatile content of 62.8% and a carbodiimide equivalent weight of 331 on solution.

CARBODIIMIDE #4

Carbodiimide #4 was synthesized as follows.

A one liter, three neck flask, fitted with a condenser, an agitator, thermocouple, and subsurface nitrogen inlet was charged with 117.3 grams (0.48 moles) of metatetramethylxylene diisocyanate, 82.7 grams (0.32 moles) of methylene bis-(4-cyclohexyl isocyanate), 170.0 grams of xylene, and 15.8 grams (0.008 moles) of a 9.74 weight percent solution of 3-methyl-1-phenyl-2-phospholene-1-oxide in xylene. A nitrogen sparge was followed by a slow subsurface nitrogen stream that continued throughout the synthesis. Under agitation, the temperature was maintained at 145° C.–150° C. for 11 hours. The temperature was reduced to 110° C. and 23.7 grams (0.32 moles) of n-butanol was charged into the mixture. The temperature was maintained at 110° C. for 2.5 hours. The temperature was then increased to 150° C. and maintained at that temperature for 18 hours. Then, 15.8 grams (0.008 moles) of a 9.74 weight percent solution of 3-methyl-1-phenyl-2-phospholene-1-oxide in xylene was charged into the flask. The temperature was then maintained at 145° C.–150° C. for 15.5 hours. A sample was then withdrawn from the flask and the percent NCO was determined by ASTM method D2572-87 to be 0.34 percent. The temperature was then reduced to 110° C. and 2.2 grams (0.03 moles) of n-butanol was charged into the flask. The temperature was maintained at 110° C. for 2 hours. A sample was then withdrawn and tested as above resulting in a zero NCO value.

Infrared analysis confirmed the emergence of carbodiimide functionality at 2125 $cm^{-1}$ and the disappearance of isocyanate functionality at 2260 $cm^{-1}$ throughout the synthesis. The non-volatile content of this synthesis was determined to be 54.2 percent (sample baked for 1 hour at 110° C.). The carbodiimide equivalent weight was determined to be 305.5 (Procedure of Zarembo and Watts *Microchem. J. Symp. Ser.*, 2,591 (1962)). The weight average molecular weight was determined to be 2662 by gel permeation chromatography relative to polystyrene standards.

ADDITIVE PACKAGE #1

The following materials were combined under agitation. 656.0 grams of methyl n-amyl ketone, 163.5 grams of methyl hexyl ketone, 16.3 grams of xylene, 154.0 grams of Tinvuin 123, 0.017 grams of dibutyl tin dilaurate, and 10.0 grams of Byk 331.

BASECOAT BASE EXAMPLE #1

A non-metallic commercial automotive refinish product, standard to the industry, such as Diamont Basecoat BC-470 available from BASF.

BASECOAT BASE EXAMPLE #2

A metallic commercial automotive refinish product, standard to the industry, such as Diamont Basecoat BC-151 available from BASF.

BASECOAT BASE EXAMPLE #3

A metallic commercial automotive refinish product, standard to the industry, such as Glasurit Basecoat 54 M99/12 available from BASF.

BASECOAT REDUCER #1

A commercial automotive refinish product, standard to the industry, such as Diamont Basecoat Reducer BR-50. Available from BASF.

BASECOAT REDUCER EXAMPLE #2

A commercial automotive refinish product, standard to the industry, such as Glasurit reducer 352-91. Available from BASF.

CLEARCOAT REDUCER EXAMPLE #1

A commercial automotive refinish product, standard to the industry, such as Glasurit 544-101. Available from BASF.

CLEARCOAT EXAMPLE #1

A commercial automotive refinish product, standard to the industry, such as Glasurit Clearcoat 923-54. Available from BASF.

SYNTHESIS OF ACRYLIC RESIN #1

A reaction flask fitted with an agitator, two addition feed pumps, a reflux condenser, a thermocouple probe, a heating mantle, and a nitrogen inlet was charged with 418.2 gms. of methyl n-amyl ketone. The flask was first purged, then blanketed with nitrogen. Agitation and the inert blanket was maintained throughout the synthesis. The flask contents were heated to reflux temperature (about 145°–149° C.) and the following two premixes were added uniformly over 3 hrs.

Premix #1 was 335.0 gms. of hydroxyethyl methacrylate, 412.3 gms. of styrene, 644.3 gms. of n-butyl methacrylate and 670.1 gms. of methyl methacrylate.

Premix #2 was 71.9 gms. of t-butyl perbenzoate and 188.5 gms. of methyl n-amyl ketone.

After the additions, the contents were refluxed for 1 hr., then a premix of 11.8 gms. of t-butyl perbenzoate and 117.8 gms. of methyl n-amyl ketone was added uniformly over 30 min. The flask contents were refluxed for an additional 3 hrs., then cooled and reduced to 59.2% non-volatile and a Gardner-Holt of "V" with 630.1 gms. methyl n-amyl ketone.

CLEAR EXAMPLE #1—AUTOMOTIVE CLEARCOAT CURED WITH NON-ISOCYANATE HARDENER.

The following materials were mixed together to form a ready for use automotive clearcoat.

| Acrylic resin #1 | 1626.7 gm |
|---|---|
| Additive package #1 | 925.3 gm |
| Anhydride #1 | 201.6 gm |
| Carbodiimide #1 | 987.5 gm |

The following are the results of testing done on these formulations.

| Initial viscosity #4 ford cup | 18.4" |
|---|---|
| Pot life to double viscosity | 60 min |
| Initial 20 deg. gloss | 85.3 |
| Dust free time | 20 min |
| Tack free time | 2 hrs. |
| Humidity Resistance (100° F./100% R.H.) | pass 120 hrs. |
| QUV 340 (1000 hrs. gloss retention) | 99% |
| Koenig Pendulum Hardness (21 days air dry) | 104 swings |

COMPARATIVE BASECOAT EXAMPLE—AUTOMOTIVE BASECOAT WITH AND WITHOUT NON-ISOCYANATE HARDENER.

The following materials were mixed together to form a ready for use automotive basecoat.

|  | WITH HARDENER | WITHOUT HARDENER |
|---|---|---|
| Basecoat base #1 | 80.0 gms. | 80.0 gms. |
| Basecoat base #2 | 20.0 gms. | 20.0 gms. |
| Anhydride #1 | 2.8 gms. | |
| Carbodiimide #1 | 14.0 gms. | |
| Basecoat reducer #1 | 82.0 gms. | 82.0 gms. |
| Initial viscosity (#4 Ford cup) | 16.4" | 14.0" |
| Sprayability | Excellent | Excellent |
| Appearance | Excellent | Excellent |
| Topcoat Acceptance | Excellent | Excellent |

COMPARATIVE BASECOAT/CLEARCOAT EXAMPLE #1

The following are the basecoat formulations used to compare a commercially available non crosslinked basecoat coating system with the compositions of the current invention wherein the identical basecoat base has been crosslinked with the current Non-Isocyanate chemistry. Both basecoat compositions are then clearcoated with Non-Isocyanate compositions of the current invention.

The following materials were mixed together to form a ready for use automotive basecoat.

| BASECOAT FORMULATIONS | | |
|---|---|---|
|  | Non-Isocyanate Crosslinked | Uncrosslinked |
| Basecoat base #3 | 100.0 gms. | 100.0 gms. |
| Anhydride #1 | 1.6 gms. | |
| Carbodiimide #4 | 5.5 gms. | |
| Basecoat reducer #2 | 55.0 gms. | 50.0 gms. |
| Initial viscosity (#4 Ford cup) | 16.0 sec | 16.5 sec |
| Viscosity @ 36 hrs. (#4 Ford cup) | 19.3 sec | 16.5 sec |
| Sprayability | Excellent | Excellent |
| Appearance | Excellent | Excellent |
| Topcoat Acceptance | Excellent | Excellent |

COMPARATIVE BASECOAT/CLEARCOAT EXAMPLE #1—CONTINUED

The following is a clearcoat formulation, of the current invention, used to compare a commercially available uncrosslinked basecoat coating system with compositions of the current invention wherein the identical basecoat base has been crosslinked with the current non-Isocyanate chemistry.

The following materials were mixed together to form a ready for use automotive clearcoat.

| CLEARCOAT FORMULATIONS | |
|---|---|
|  | Non-Isocyanate crosslinked |
| Clearcoat example #1 | 100.0 gm |
| Anhydride #1 | 13.0 gm |

-continued

| CLEARCOAT FORMULATIONS | |
|---|---|
| | Non-Isocyanate crosslinked |
| Carbodiimide #4 | 43.5 gm |
| Clearcoat Reducer #1 | 20.0 gm |

The above Non-Isocyanate crosslinked clearcoat was applied to the Non-Isocyanate crosslinked basecoat formulation, and the Uncrosslinked basecoat formulation described above.

The following are the results of testing done on these formulations.

| | Non-Isocyanate Clearcoat |
|---|---|
| Initial viscosity (#4 Ford cup) | 15.4" |
| Pot life (to double viscosity) | 1.5 hrs |
| VOC (ready for use) | 4.46 #/gal |

The following are the results of panel testing done on the crosslinked and non-crosslinked basecoat systems.

| | Crosslinked Basecoat | Non-Crosslinked Basecoat |
|---|---|---|
| 24 hr. recoatability | OK | Fail |
| Initial 20 deg. gloss | 92.7 | 92.4 |
| Dust free time | 30' | 30' |

We claim:

1. A pigmented basecoat coating composition consisting essentially of:
   a) a coreactant having an active hydrogen functionality,
   b) at least one anhydride functional coreactant,
   c) a carbodiimide compound having the formula:

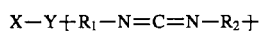

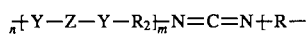

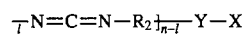

Wherein:
   m is from 0 to 1
   n is from 1 to 10
   $R_1$=A divalent hydrocarbon residue from a diisocyanate having a tertiary hydrocarbon selected from the group consisting of:

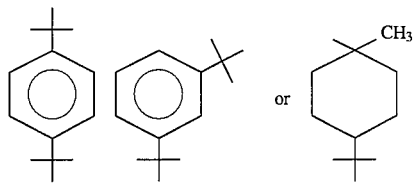

$R_2$=A divalent hydrocarbon residue from a diisocyanate selected from:

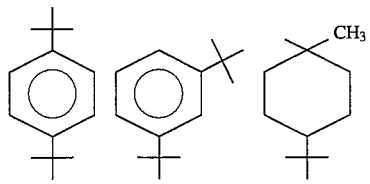

or residues from aliphatic, branched aliphatic or cycloaliphatic diisocyanates, biurets, allophonates, isocyanurates or uretdiones thereof;

X=Any radical with substituents that are unreactive towards a carbodiimide;

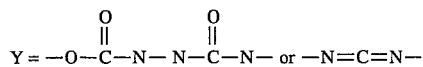

Z=A polyvalent radical with substitutents that are unreactive towards a carbodiimide to function as an extending or branching site.

2. The basecoat coating composition of claim 1 wherein the carbodiimide has the structure wherein n=2 to 5 and m=0.

3. The basecoat coating composition of claim 1 wherein the carbodiimide has the structure wherein n=2 to 5 and m=1.

4. The basecoat coating composition of claim 1 wherein the carbodiimide has the structure wherein X is a radical selected from the group consisting of aliphatic, branched aliphatic, cyclo aliphatic, aromatic hydrocarbon, organosilane and salted sulfonic acid radicals.

5. The basecoat coating composition of claim 1 wherein the carbodiimide has the structure wherein X is a polymeric radical selected from polyether and polyester.

6. The basecoat coating compositions of claim 1 wherein the carbodiimide has the structure where in 2 is radical selected from the group consisting of aliphatic, branched aliphatic, cycloaliphatic, aromatic hydrocarbon, organosilane and salted salfonic acid radicals.

7. The basecoat coating composition of claim 1 wherein the carbodiimide has the structure wherein 2 is a polymeric radical selected from polyether and polyester.

* * * * *